US00RE45399E

(19) United States
(12) Reissued Patent
Kafenshtok et al.

(10) Patent Number: US RE45,399 E
(45) Date of Reissued Patent: Mar. 3, 2015

(54) MOUNTING STRUCTURE FOR FIRE PROTECTION SYSTEMS

(71) Applicant: Victaulic Company, Easton, PA (US)

(72) Inventors: Charles Kafenshtok, Highland Park, IL (US); Charles V. Oakes, Woodstock, IL (US)

(73) Assignee: Victaulic Company, Easton, PA (US)

(21) Appl. No.: 13/986,245

(22) Filed: Apr. 16, 2013

Related U.S. Patent Documents

Reissue of:
(64) Patent No.: 7,784,746
Issued: Aug. 31, 2010
Appl. No.: 12/646,460
Filed: Dec. 23, 2009

U.S. Applications:
(62) Division of application No. 13/556,441, filed on Jul. 24, 2012, which is an application for the reissue of Pat. No. 7,784,746, which is a division of application No. 11/877,415, filed on Oct. 23, 2007, now Pat. No. 7,735,787.

(60) Provisional application No. 60/862,813, filed on Oct. 25, 2006.

(51) Int. Cl.

| | |
|---|---|
| ***A62C 13/78*** | (2006.01) |
| ***A62C 13/76*** | (2006.01) |
| ***B05B 15/06*** | (2006.01) |

(52) U.S. Cl.
USPC ..... 248/75; 248/317; 248/342; 248/343; 169/37; 239/283

(58) Field of Classification Search
USPC ..... 169/37, 51; 248/68.1, 73, 74.1, 75, 248/221.11, 222.11, 222.14, 316.1, 316.5, 248/317, 342, 343
See application file for complete search history.

(56) References Cited

U.S. PATENT DOCUMENTS

| | | | | |
|---|---|---|---|---|
| 5,622,341 | A * | 4/1997 | Stana | 248/74.1 |
| 6,260,810 | B1 | 7/2001 | Choi | |
| 6,811,130 | B1 | 11/2004 | Oh | 248/343 |
| 6,843,394 | B2 * | 1/2005 | Aki | 224/309 |
| 7,255,315 | B2 | 8/2007 | Oh | |
| 7,264,214 | B2 | 9/2007 | Oh | |
| 7,427,051 | B2 | 9/2008 | Oh | |
| 7,506,845 | B2 | 3/2009 | Oh | |
| 2005/0139743 | A1 | 6/2005 | Shim | |

FOREIGN PATENT DOCUMENTS

| | | | | |
|---|---|---|---|---|
| KR | Y1-20-0415188 | * | 5/2006 | A62C 35/68 |

* cited by examiner

*Primary Examiner* — Darren W Gorman
(74) *Attorney, Agent, or Firm* — Oliff PLC

(57) ABSTRACT

In an embodiment of the present invention there is disclosed a mounting assembly for a sprinkler reducer. The assembly includes a mounting bracket having a locking unit, a latitudinal support bar to which the mounting bracket is movably coupled, and a pair of longitudinal support units which are coupled to opposite ends of the support bar.

62 Claims, 9 Drawing Sheets

MOUNTING STRUCTURE FOR FIRE PROTECTION SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is one of two reissue applications of U.S. Pat. No. 7,784,746. The first reissue application is application Ser. No. 13/556,441, filed Jul. 24, 2012. This reissue application is a reissue divisional of Reissue application Ser. No. 13/556,441.*

CROSS REFERENCE TO RELATED APPLICATIONS

This application is a divisional application of U.S. application Ser. No. 11/877,415, which claims benefit to U.S. Provisional Application 60/862,813 filed on Oct. 25, 2006.

FIELD OF THE INVENTION

The present invention relates generally to mounting apparatuses for sprinklers, and more particularly to a mounting apparatus for sprinklers which has a simple but firm mounting structure in which a fixing bracket couples a sprinkler reducer to a support beam, and a pair of vertical brackets mounts the support beam to a pair of ceiling t-bar support rails.

DESCRIPTION OF THE RELATED ART

As well known to those skilled in the art, a plurality of ceiling support rails horizontally extend in parallel on the ceiling in a building to form a ceiling support structure, with a ceiling panel being mounted to the bottoms of the ceiling support rails so as to form a desired ceiling. A plurality of support beams are mounted on the ceiling support rails by a plurality of mounting apparatuses so as to hold reducers of a sprinkler system in the ceiling.

Such a conventional mounting apparatus for sprinklers includes a pair of ceiling support rails horizontally extending in parallel to the ceiling in the building, with a predetermined gap defined between the pair of ceiling support rails. The conventional mounting apparatus further includes a pair of vertical brackets which are respectively mounted at lower ends thereof to upper ends of the pair of ceiling support rails. The conventional mounting apparatus further includes a support beam which is horizontally held on upper ends of the pair of vertical brackets to be perpendicular to the ceiling support rails, and a fixing bracket provided at a predetermined position of the support beam between the pair of ceiling support rails, so as to vertically hold a sprinkler reducer which has a sprinkler head at an end thereof. However, when the fixing bracket couples the sprinkler reducer to the support beam and the pair of vertical brackets mount the reducer support beam to the pair of ceiling support rails, the conventional mounting apparatus must use a plurality of bolts as a fastening means.

Due to the above-mentioned construction using the plurality of bolts as the fastening means, the conventional mounting apparatus for sprinklers is problematic in that assembling and disassembling processes thereof are complex, thus reducing work efficiency while installing or removing the sprinklers in or from the ceiling.

SUMMARY OF THE INVENTION

In accordance to various embodiments outlined in the present invention, a summary of some of the embodiments is provided herein. In one embodiment, there is provided a support assembly for positioning and supporting a sprinkler reducer in a ceiling. The support system includes a latitudinal support unit having two ends opposed from one another, a mounting bracket assembly positioned between the ends of the latitudinal support unit for positioning and supporting the sprinkler reducer, and a pair of longitudinal support units separately positioned on the two ends of the latitudinal support unit.

Each longitudinal support unit may include a support region for receiving and supporting a top portion of a T-shaped ceiling frame member. The longitudinal support units may be further defined by having a top element with an opening therethrough. Extending from the top element are two oppositely positioned side elements. Each side element includes a support bar window for receipt of an end of the latitudinal support bar. A top tightening element positioned through the opening in the top element can be used for securing the end of the latitudinal support bar to the support unit. The side elements further include lower portions with a flange extending inwardly towards the opposite side element and positioned under the flanges are first sections bending towards the oppositely positioned side element. The aforementioned support region for receiving and supporting the top portion of the T-shaped ceiling frame member can thus be defined between the flanges and the first sections. Extending from the first sections are leg elements that position against the T-shaped ceiling frame member below the top portion thereof.

In addition thereto, each side element may further include a sill positioned below each support bar window and extending inwardly towards the opposite side element for supporting the end of the latitudinal support bar. Furthermore, the ends of each side element may include extending side sections such that the ends of each side element have a width greater than a width defined by the side elements. Yet further still, the side elements may further include aligned openings for receiving a side tightening element which is capable of moving the leg elements of the two side elements towards each other and away from each other.

In yet another embodiment of the present invention, the mounting bracket assembly may include a mounting bracket having a pair of sidewalls extending from a base wall to form a mounting channel along a entire length of the base wall. The mounting bracket may further have a mouth such that the latitudinal support unit may be positioned between the sidewalls in the mounting channel against the base wall. Each sidewall may include an opening along an end of the sidewall opposite the base wall. The opening has a predetermined shape to accommodate a portion of a profile defined by the sprinkler reducer, and each sidewall further includes a through hole and a flange. The mounting bracket assembly further includes a locking unit that is shaped from a wire and has a pair of ends positioned in the through holes in each sidewall such that the locking unit may pivot about the through holes. The locking unit may be further defined as including first intermediate sections extending from the pair of ends, the first intermediate sections traversing the openings in the sidewalls and having a predetermined shape to accommodate another portion of the profile defined by the sprinkler reducer, second intermediate sections extending from the first intermediate sections to engage the flanges on the sidewalls, and a handle section extending from and joining the second intermediate sections.

In yet another embodiment of the present invention the mounting bracket assembly may be defined as having a mounting bracket positioned on the latitudinal support unit between the pair of longitudinal support units for positioning and supporting the sprinkler reducer. The mounting bracket may have a pair of sidewalls extending from a base wall to form a mounting channel along a entire length of the base wall. The mounting bracket may further have a mouth such that the latitudinal support unit may be positioned between the sidewalls in the mounting channel against the base wall. Each sidewall includes an opening along an end of the sidewall opposite the base wall, and the openings having a predetermined shape to accommodate a portion of a profile defined by the sprinkler reducer. The mounting bracket assembly further includes a locking unit being pivotally secured to at an end to both sidewalls. The locking unit includes a pair of side members extending downwardly from a base member, each side member further includes an opening along an end of the side members opposite the base member. The openings have a predetermined shape to accommodate a portion of the profile defined by the sprinkler reducer. The base member includes a slot positioned such that an opening to the slot is positioned at an edge of the base member between the two side members. The mounting bracket assembly further includes a locking member pivotally mounted to the two sidewalls on the mounting bracket and having an elongated shaft extending upwardly for receipt into the slot on the base member of the locking unit. A locking nut is positioned on the elongated shaft such that when the locking unit is in a closed positioned about the mounting bracket the openings in the sidewalls and in the side members align to accommodate the sprinkler reducer and the elongated shaft may be pivoted to be received into the slot thereby allowing the locking nut to be tightened to secure the locking unit to the mounting bracket and secure a sprinkler reducer positioned therebetween.

Numerous other advantages and features of the invention will become readily apparent from the following detailed description of the invention and the embodiments thereof, from the claims, and from the accompanying drawings.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
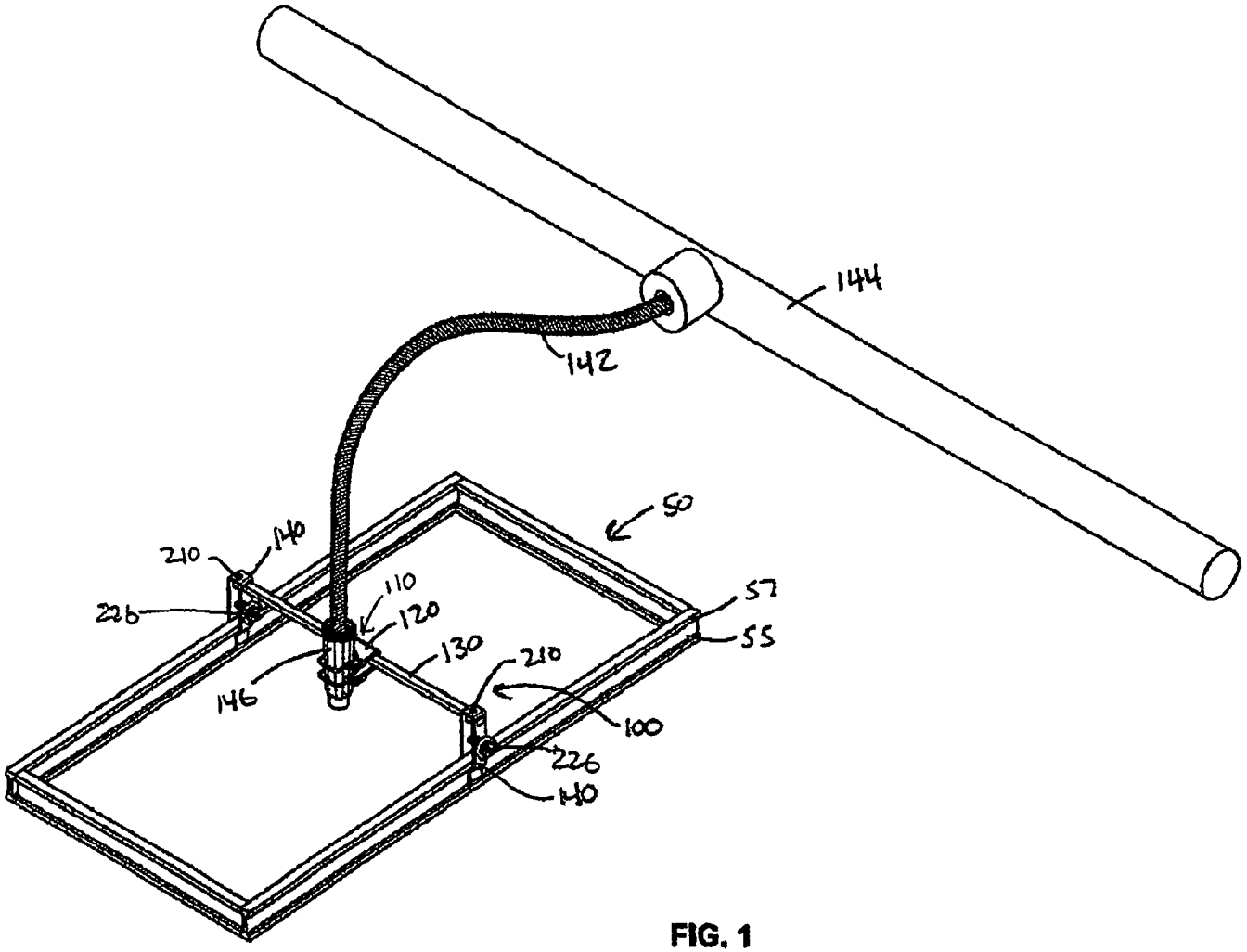
FIG. 1 is a perspective view of a mounting structure assembly for a sprinkler system in accordance to an embodiment of the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 2:
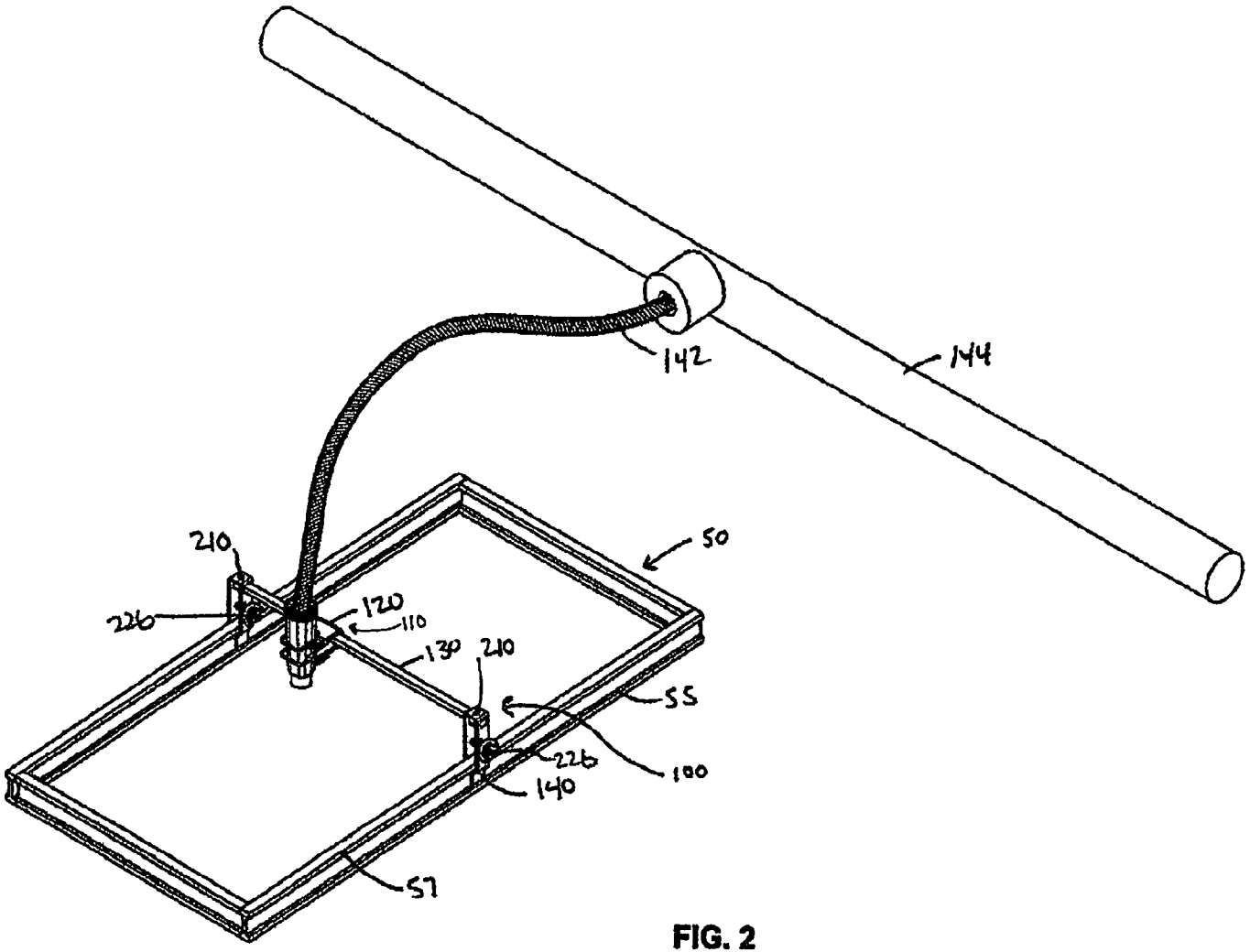
FIG. 2 is another perspective view of FIG. 1 showing the mounting bracket for the sprinkler reducer in another position.
Figure 3A:
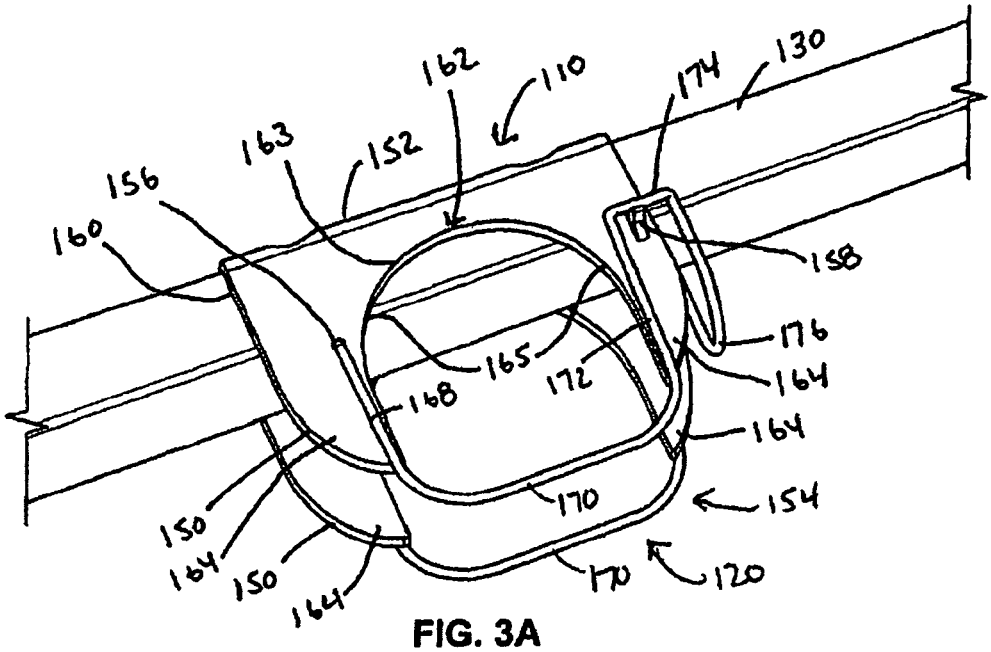
FIG. 3A is a perspective view of a sprinkler reducer mounting bracket in accordance with an embodiment of the present invention and also showing the latitudinal support bar positioned therein.
Figure 3B:
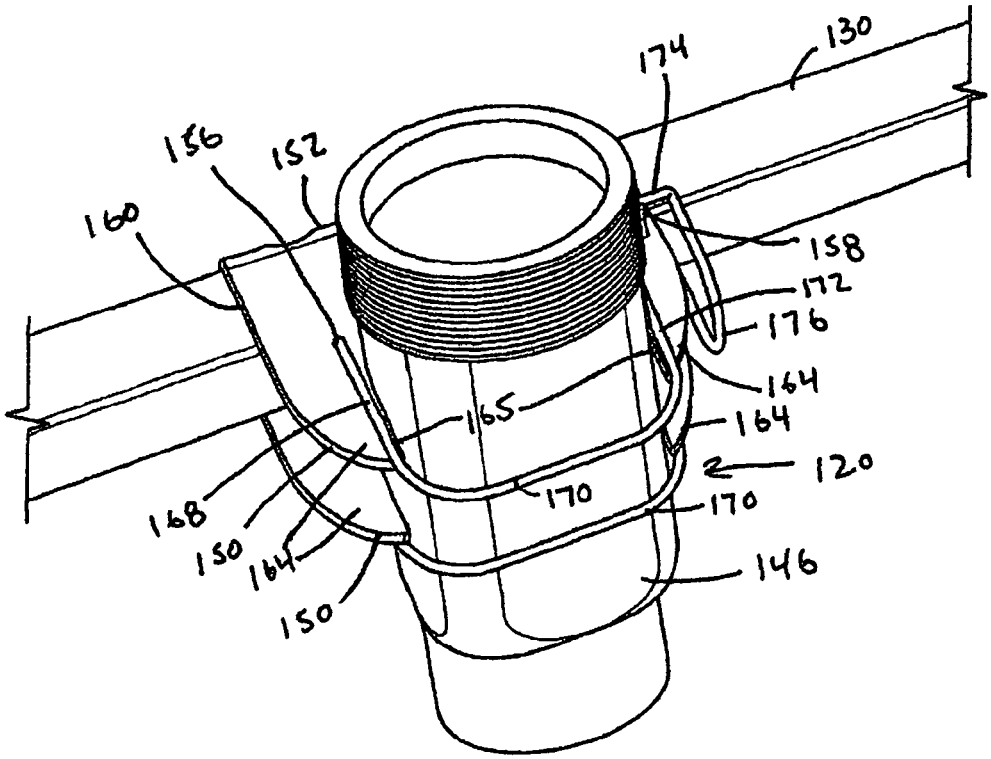
FIG. 3B is a perspective view of FIG. 3A with the sprinkler reducer secured thereto.
Figure 3C:
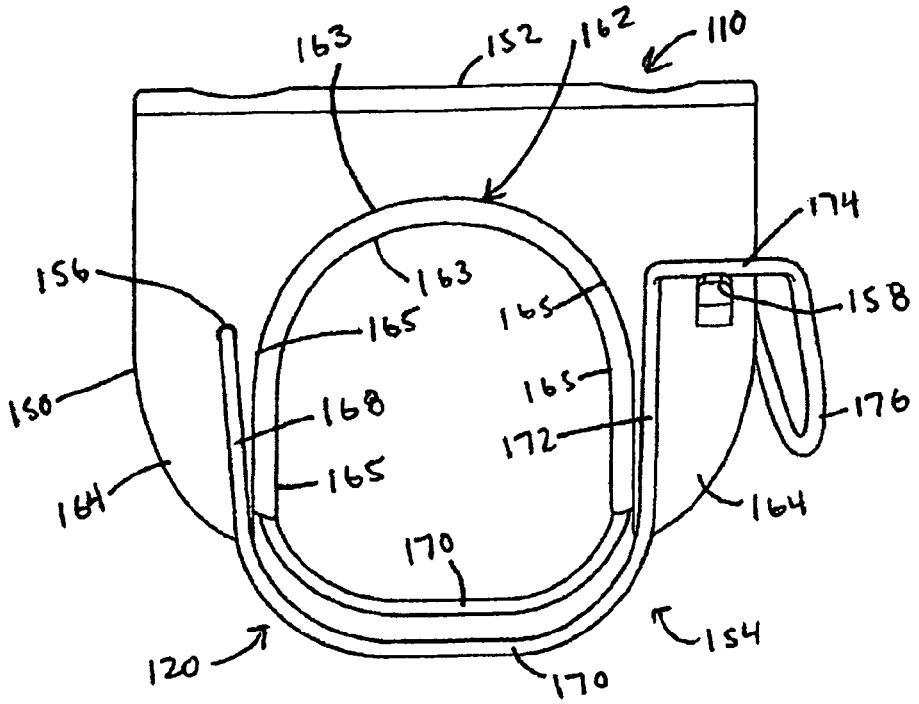
FIG. 3C is a side view of the sprinkler reducer mounting bracket.
Figure 3D:
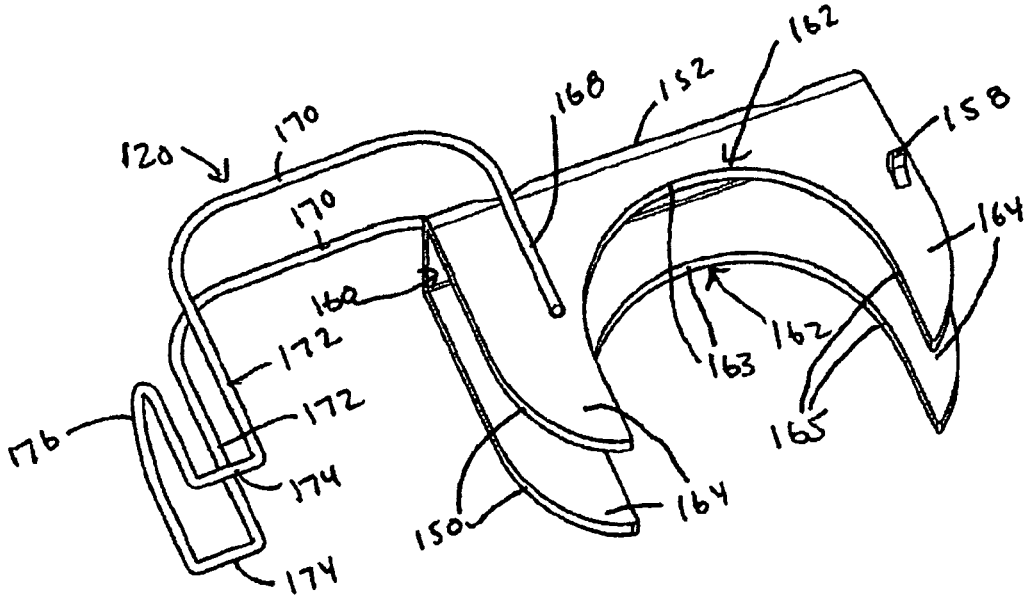
FIG. 3D is a perspective view of FIG. 3C showing the locking unit in an opened position.
Figure 3E:
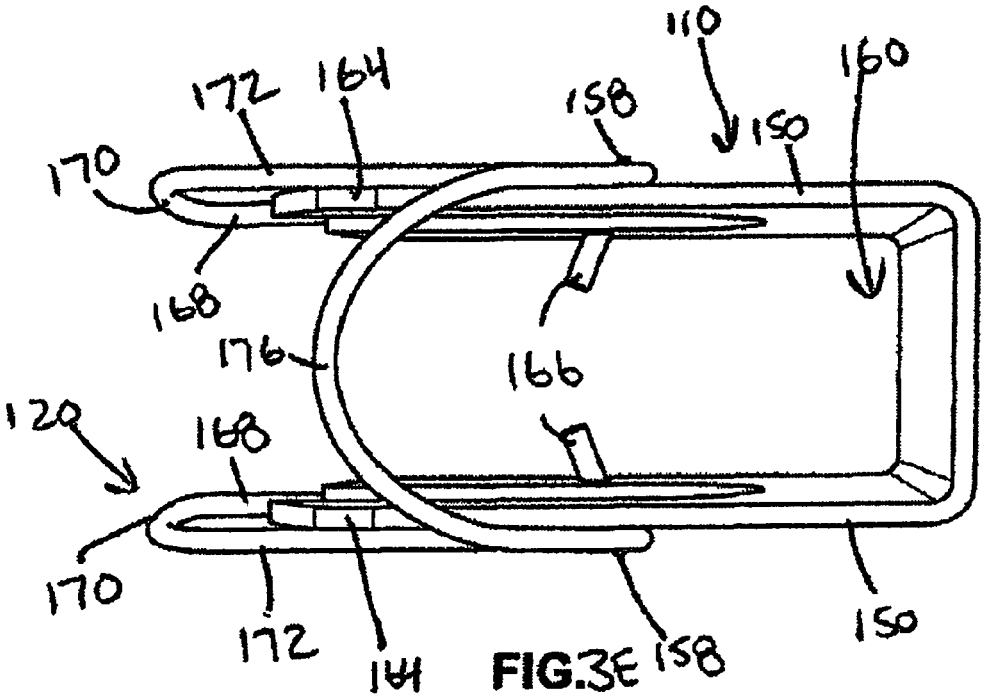
FIG. 3E is a front view of FIG. 3C.

Referring now to FIG. 1, a sprinkler mounting assembly 100 according to a first embodiment of the present invention is shown. The sprinkler mounting assembly 100 includes a mounting bracket 110 having a locking unit 120, a latitudinal support bar 130 to which the mounting bracket 110 is movably coupled, and a pair of longitudinal support units 140 which are coupled to opposite ends of the support bar 130. As shown in FIG. 2, the mounting bracket 110 may slide or move along the length of the latitudinal support bar 130, such that the placement of the sprinkler system is easily adjustable during assembly.

Referring now also to FIGS. 3A-3E, the mounting bracket 110 includes two sidewalls 150 separated by a base wall 152 having a predetermined width such that the two sidewalls 150 are spaced apart from one another by a predetermined distance. The mounting bracket 110 has a mouth 154 at an end opposite the base wall 152. The two sidewalls 150 also include a through hole 156 and a flange 158. The mounting bracket 110 further has a mounting channel 160 formed along the length of base wall 152 and between the two sidewalls 150 to allow receipt of the latitudinal support bar 130. This permits the latitudinal support bar 130 to be positioned against and be supported by the entire base wall 152, which may be an improved manner of support than the prior art. The two sidewalls 150 further include a U-shaped opening 162 positioned in the sidewalls 150 such that a remaining portion 164 is present on either side of the opening 162. The U-shaped opening 162 has a predetermined curvature to accommodate the profile of a sprinkler reducer 146. The U-shaped opening 162 may further be defined as having a curved end 163 that mates to two longitudinal ends 165. As known in the art, the sprinkler reducer 146 may be attached at one end to a flexible tubing 142, which is further secured to a water supply pipe 144.

The mounting bracket 110 further includes a locking unit 120 that may be preferably rigidly constructed, such as, but not limited to, a steel wire bent to form the shape as described herein. The locking unit 120 includes a pair of ends 166 to pass through the through holes 156 on each sidewall 150. The locking unit 120 bends from the pair of ends 166 to form first leg portions 168 that traverse the length of U-shaped opening 162 running along one of the remaining portions 164. Extending beyond the two sidewalls 150, the first leg portions 168 then bend to from latitudinal portions 170 that traverse the U-shaped opening 162. At the opposite side of the U-shaped opening 162, the locking unit 120 bends to form second leg portions 172, which run down the opposite remaining portions 164 towards the flanges 158. The locking unit 120 then forms mating portions 174 that can be positioned against the flanges 158 (to lock the sprinkler reducer 146 as shown in FIGS. 1 and 2 in place). From the mating portions 174 the locking unit 120 bends to form a handle portion 176 that connects the two mating portions 174 on either sides of the locking unit 120.

During operating, the sprinkler reducer 146 is positioned in the U-shaped opening 162 and the locking unit 120 is moved such that the latitudinal portions 170 are positioned against the sprinkler reducer 146. The mating portions 174 are locked against the flanges 158, thereby locking the sprinkler reducer 146 into position. The sprinkler reducer 146 is thus supported by the latitudinal portions 170 and the U-shaped opening 162. To remove the sprinkler reducer 146, the mating portions 174 are unlocked from the flanges 158 allowing the locking unit to pivot away from the sprinkler reducer 146 about its ends 166 and the through holes 156.

Figure 4C:
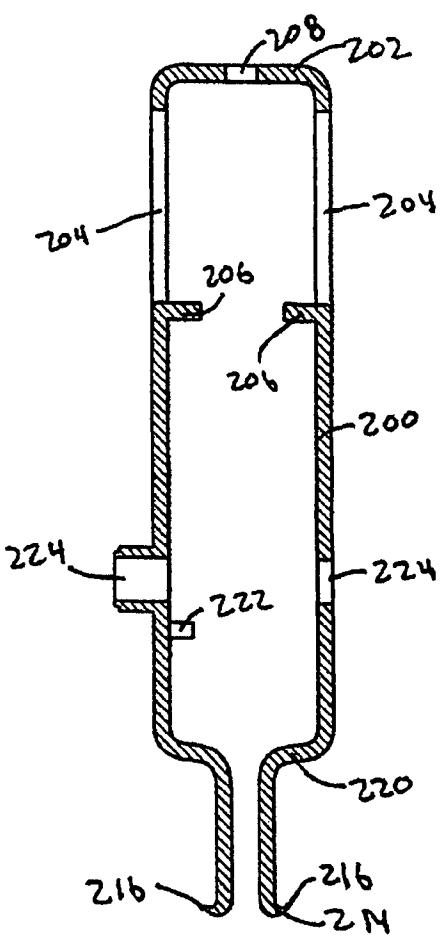
FIG. 4C is a cross-sectional view of line 4C taken from FIG. 4B.
Figure 4B:
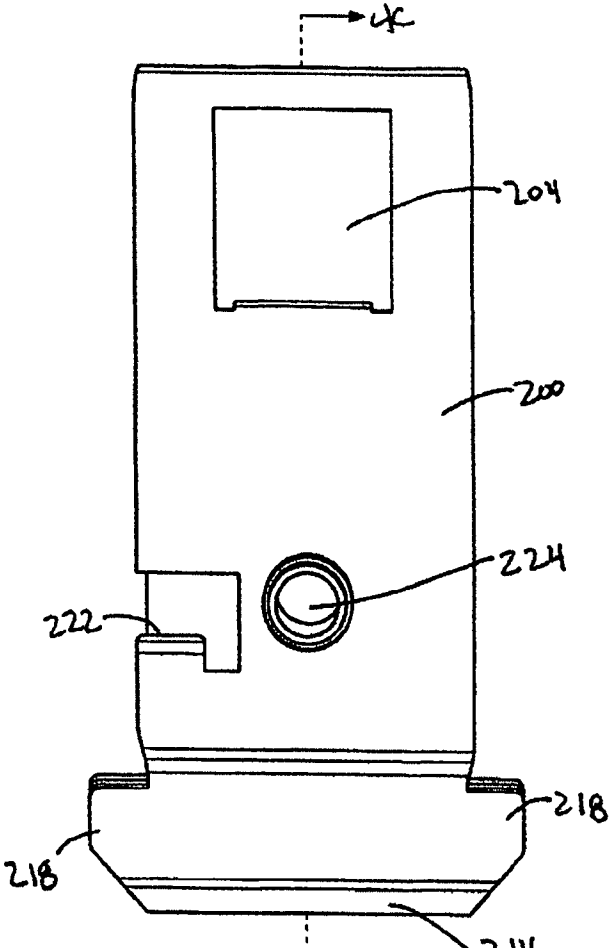
FIG. 4B is a side view of FIG. 4A
Figure 4A:
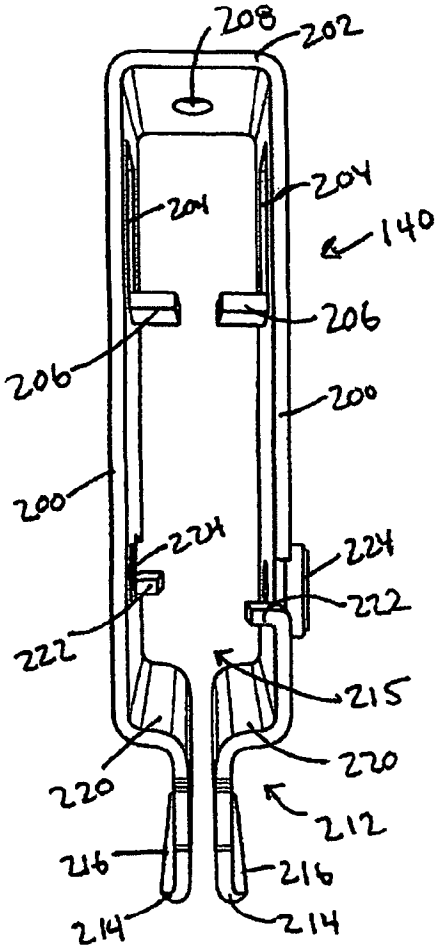
FIG. 4A is a front view of a longitudinal support unit in accordance to an embodiment of the present invention.

Referring now to FIGS. 4A-4C, there is shown one of the pairs of longitudinal support units 140, which is shown in FIGS. 1 and 2 and used to connected the latitudinal support bar 130 to connect the sprinkler system to a ceiling frame section 50 or more particularly to a frame support member 55. As is well known in the industry, the frame support members 55 have a T-shaped portion 57 near its top portion that is used to connect to the longitudinal support units 140, as discussed in greater detail below.

Each longitudinal support unit 140 includes two side members 200 that extend downwardly from a top member 202. Each side member 200 includes a support bar window 204 for receipt of an end of the latitudinal support bar 130. A sill member 206 is positioned below each support bar window 204 extending inwardly towards the opposite side member 200.

The sill member 206 lends support to or helps seat the latitudinal support bar 130 that is inserted through the support bar window 204. The top member 202 includes a threaded aperture 208 to receive a tightening element 210 (shown in FIG. 1), such as a screw, that can be used to lock the longitudinal support unit 140 in a substantially rigid position against the latitudinal support bar 130.

A lower portion 212 of side member 200 moves inwardly at a first section 220 towards each other and then turns downwardly to ends 214 of each of the side members 200. Positioned above the first sections 220 on both side members 200 are flanges 222. The area between the flanges 222 and the first sections 220 creates a latitudinal support region 215 along the first sections 220 and the side member 200 for receiving the top of the T-shaped portion 57.

The ends 214 of the side members 200 may have a slight outwardly flared region 216 to help accommodate the top of the T-shaped portion 57 of the frame support member 55. The ends 214 further include extending side sections 218 that make the ends 214 wider then the widths of the side members. This serves as a means to help grab into the top of the T-shaped portion 57 when the sprinkler system is in use and is exhibiting a large amount of back pressure. This also serves as a means to prevent rocking of the mounting apparatus on the frame support members 55.

Positioned through the side members 200 near the positions of the flanges 222 are threaded openings 224 for receiving a tightening bolt 226 (shown in FIGS. 1 and 2). When the tightening bolt 226 is tightened, the side members 200 move towards each other causing the ends 214 to pinch against sides of the frame support member 55 and securing the T-shaped portion 57 in the latitudinal support region 215. Conversely, when the tightening bolt 226 is loosened, the ends 214 release and the longitudinal support unit 140 may be removed from the frame support member 55.

Figure 4D:
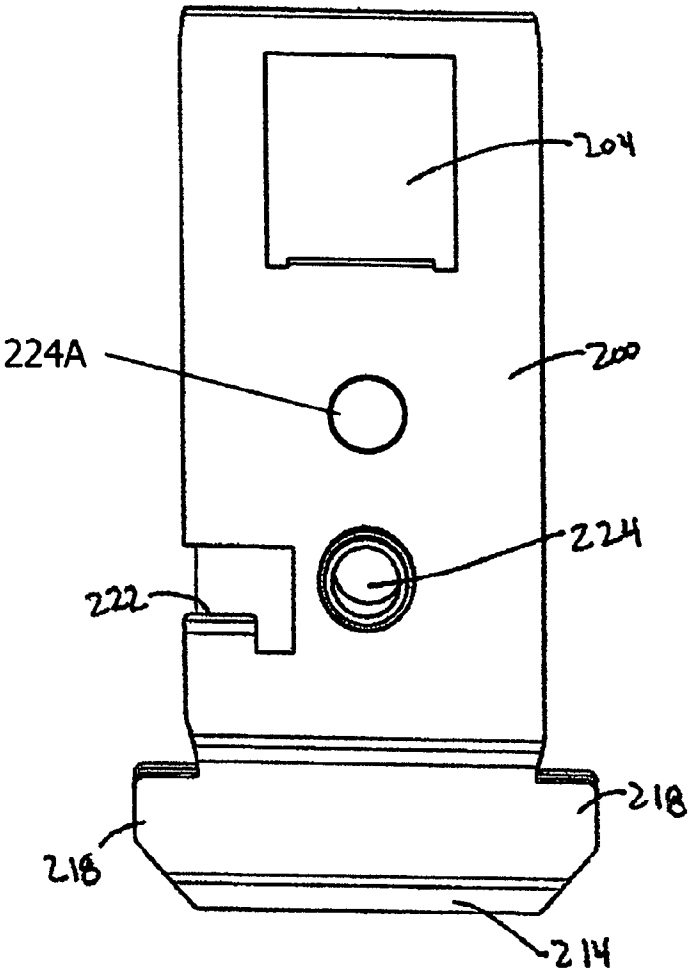
FIG. 4D is a side view of a second longitudinal support unit.
Figure 5A:
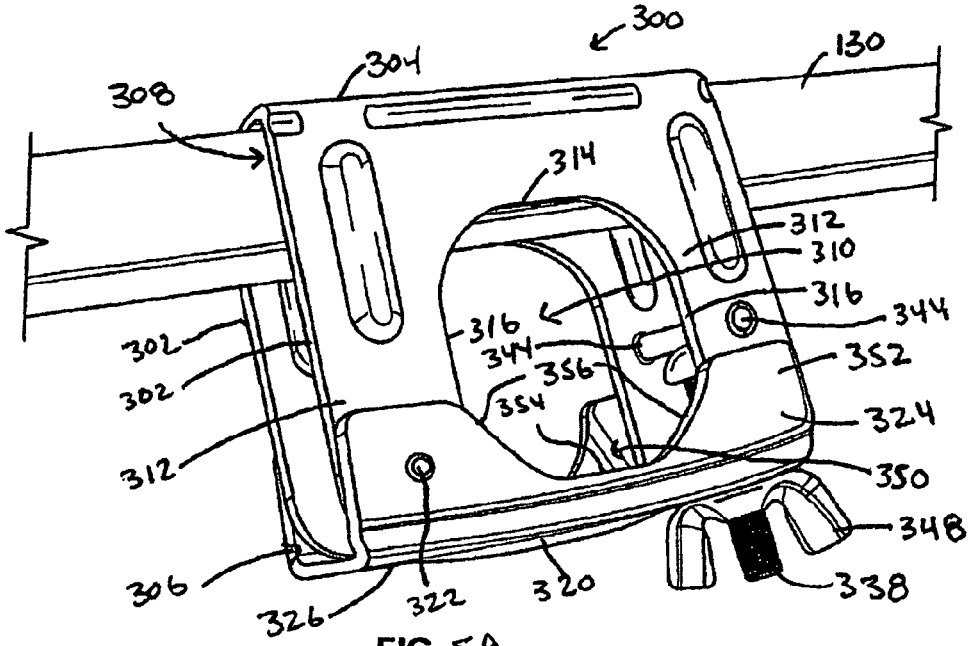
FIG. 5A is a perspective view of a sprinkler reducer mounting bracket in accordance with an alternative embodiment of the present invention and also showing the latitudinal support bar positioned therein.
Figure 5B:
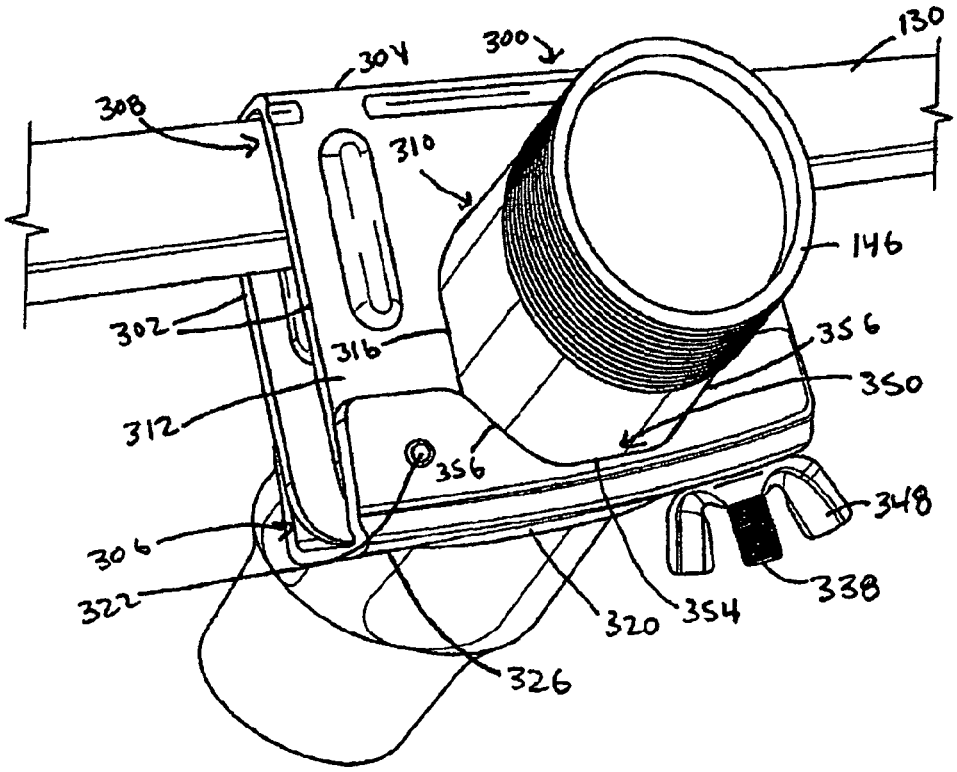
FIG. 5B is a perspective view of FIG. 5A with the sprinkler reducer secured thereto.
Figure 5D:
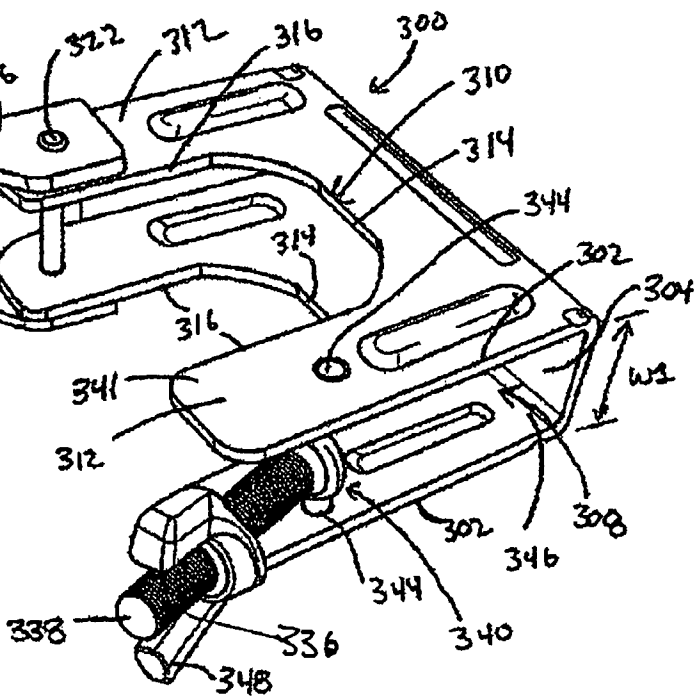
FIG. 5D is another perspective view of the mounting bracket from FIG. 5A.
Figure 5C:
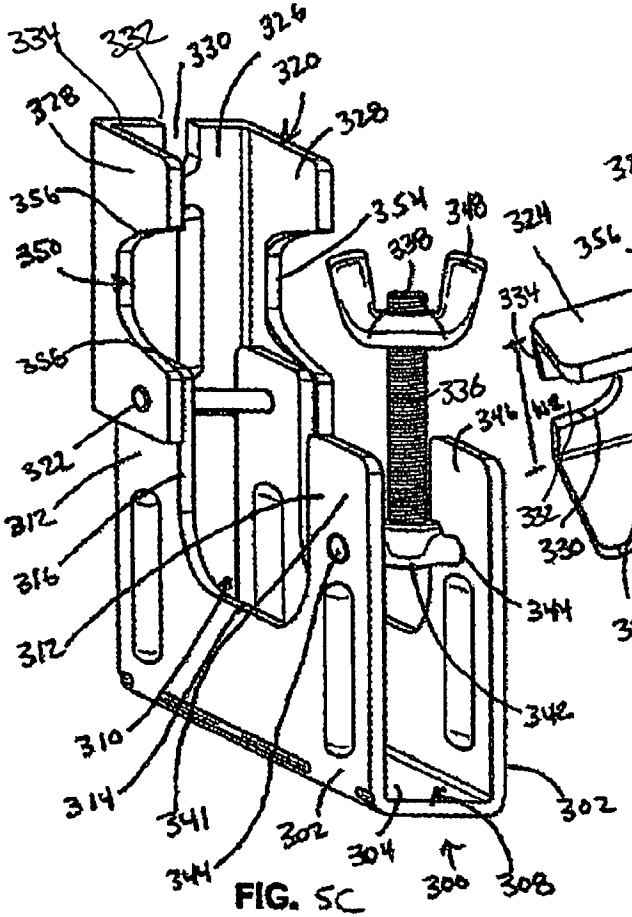
FIG. 5C is a perspective view of the mounting bracket from FIG. 5A and illustrating a locking unit in an opened position.

Referring now also to FIG. 4D, there is shown a longitudinal support unit 140 that includes a secondary threaded opening 224a positioned above the primary threaded opening 224. Either opening 224 or 224a could be used to secure the longitudinal support unit 140 to the side of a ceiling structure or wall. In addition, the longitudinal support unit 140 illustrated in FIGS. 4A-4C could also be secured to a wall of other mountable structure by using a mounting member through the threaded opening 224. In some instances when a ceiling frame section is not used or provided, the mounting structure 100 can still be secured in a building to a wall, I-beam, or other mountable structures.

Referring now also to FIGS. 5A-5G, there is shown a second type of mounting bracket 300 in accordance with another embodiment of the present invention. The mounting bracket 300 includes two sidewalls 302 separated by a base wall 304 having a predetermined width such that the two sidewalls 302 are spaced apart from one another by a predetermined distance. The mounting bracket 300 has a mouth 306 at an end opposite the base wall 304. The mounting bracket 300 further has a mounting channel 308 formed along the length of base wall 304 and between the two sidewalls 302 to allow receipt of the latitudinal support bar 130. This permits the latitudinal support bar 130 to be positioned against and be supported by the entire base wall 304, which may be an improved manner of support than the prior art. The two sidewalls 302 further include a U-shaped opening 310 positioned in the sidewalls 302 such that a remaining side portion 312 is present on either side of the opening 310. The U-shaped opening 310 has a predetermined curvature to accommodate the profile of a sprinkler reducer 146. The U-shaped opening 310 may further be defined as having a curved end region 314 that merges into to two longitudinal ends 316.

The mounting bracket 300 further includes a locking unit 320 that is pivotally secured to at pivot points 322 on both sidewalls 302, and preferably located at one of the remaining side portions 312. The locking unit 320 includes a pair of side members 324 that extend downwardly from a base member 326. The base member 326 may also have a width W2 that is greater then the width W1 defined by the base wall 304 on the mounting bracket 300. Alternatively, the side members 324 may extend at an angle A1 from the base member 326. In either instance, the side members 324 would have an interior section 328 that would overlap the exterior section 341 on the sidewalls 302. The side members 324 further include a U-shaped opening 350 positioned in the side members 324 such that remaining side portions 352 are present on either side of the openings 350. The U-shaped opening 350 has a predetermined curvature to accommodate the profile of a sprinkler reducer 146. The U-shaped opening 350 may further be defined as having a curved end region 354 that merges into to two longitudinal ends 356.

The base member 326 further includes a slot 330 positioned such that an opening 332 to the slot is positioned at an edge 334 of the base member 326. The locking unit 320 further includes a locking member 336 defined has having an elongated shaft 338 pivotally connected at one end 340 to the sidewalls 302 of the mounting bracket 300. The pivotal connection includes a transverse section 342 pivotally connected at points 344 to the interior region 346 of the sidewalls 302. The elongated shaft 338 is threaded to receive a locking nut 348.

During operating, the sprinkler reducer 146 is positioned in the U-shaped opening 310 and the locking unit 320 is pivoted such that its U-shaped opening 350 is also positioned against the sprinkler reducer 146. The elongated shaft 338 is then pivoted such that it is received in the slot 330 and the locking nut 348 is turned to tightly secure the locking unit 320 with the mounting bracket 300. The sprinkler reducer 146 is thus supported and secured within the two U-shaped openings defined by the locking unit 320 and the mounting bracket 300. To remove the sprinkler reducer 146, the locking nut 348 is loosened such that the elongated shaft 338 is able to pivot out of the slot and the locking unit 320 may pivot into an opened positioned away from the sprinkler reducer 146.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A support assembly for positioning and supporting a sprinkler reducer in a ceiling, the support system comprising:

a latitudinal support unit having two ends opposed from one another;

a pair of longitudinal support units separately positioned on the two ends of the latitudinal support unit, each longitudinal support unit includes a support region for receiving and supporting a top portion of a T-shaped ceiling frame member; *and* a mounting bracket positioned on the latitudinal support unit between the pair of longitudinal support units for positioning and supporting the sprinkler reducer, the mounting bracket [having] *including:*

*a base having* a pair of sidewalls extending from a base wall to form a mounting channel along [a] *an* entire length of the base wall, the [mounting bracket] *base* further having a mouth such that the latitudinal support unit may be positioned between the sidewalls in the mounting channel against the base wall, each sidewall includes an opening along an end of the sidewall opposite the base wall, the opening having a predetermined shape to accommodate a portion of a profile defined by the sprinkler reducer, each sidewall further includes a through hole and a flange; and a locking unit being shaped from a wire and having a pair of ends positioned in the through holes in each sidewall such that the locking unit may pivot about the through holes, the locking unit further including first intermediate sections extending from the pair of ends, the first intermediate sections traversing the openings in the sidewalls and having a predetermined shape to accommodate another portion of the profile defined by the sprinkler reducer, the locking unit further including second intermediate sections extending from the first intermediate sections to engage the flanges on the sidewalls, and further including a handle section extending from and joining the second intermediate sections.

2. The support assembly of claim 1, wherein the longitudinal support units are further defined by having:

a top element having an opening therethrough;

two oppositely positioned side elements extending downwardly from the top element, each side element includes a support bar window for receipt of an end, from the two ends of the latitudinal support bar, a top tightening element positioned through the opening in the top element for securing the end of the latitudinal support [bar] *unit*; and a lower portion of each side element includes a flange extending inwardly towards the opposite side element, positioned under the flanges, the lower portions bend towards the oppositely positioned side element to create a first section defining the support region between the flanges and the first sections for receiving and supporting the top portion of the T-shaped ceiling frame member, the lower portions further bend from the first sections to create leg elements that position against the T-shaped ceiling frame member below the top portion thereof.

3. The support assembly of claim 2, wherein each side element further [include] *includes* a sill positioned below each support bar window and extending inwardly towards the opposite side element for supporting the end of the latitudinal support [bar] *unit*.

4. The support assembly of claim 3, wherein each side element further includes ends extending from the leg elements, the ends having a slight outwardly flared region.

5. The support assembly of claim 4, wherein the ends of each side element include extending side sections such that the ends of each side element have a width greater than a width defined by the side elements.

6. The support assembly of claim 5, wherein the side elements further include aligned openings for receiving a side tightening element which is capable of moving the leg elements of the two side elements towards each other and away from each other.

7. The support assembly of claim 1, wherein the openings in the sidewalls are positioned such that a remaining portion of the sidewall is present on either side of the opening.

8. The support assembly of claim 1, wherein the locking unit [is] has a rigid construction.

*9. A mounting bracket positionable on a lateral support bar of a support assembly in a ceiling and for supporting a sprinkler assembly, the mounting bracket comprising:*

*a base configured to engage the lateral support bar and having an opening sized and configured to receive and engage the sprinkler assembly;*

*a locking unit movably coupled to the base and movable between an open position permitting insertion of the sprinkler assembly into the opening and a closed position in which the sprinkler assembly is to be secured by the base and the locking unit; and*

*a locking member that locks the locking unit in the closed position and includes an elongated shaft that is substantially perpendicular to the lateral support bar when the locking member locks the locking unit in the closed position, wherein the elongated shaft engages the base and the locking unit when the locking member locks the locking unit in the closed position.*

*10. The mounting bracket according to claim 9, wherein:*

*the base comprises a first base wall and a first pair of sidewalls extending from the first base wall in spaced apart relation to one another, each of the first pair of sidewalls defines the opening and the opening is positioned opposite the first base wall; and*

*the locking unit is pivotally coupled to at least one of the first pair of sidewalls.*

*11. The mounting bracket according to claim 10, wherein the locking unit comprises:*

*a second base wall; and*

*a second pair of sidewalls extending from the second base wall in spaced apart relation from one another, wherein the second pair of sidewalls is pivotally coupled to the first pair of sidewalls.*

*12. The mounting bracket according to claim 11, wherein the elongated shaft is coupled to one of (a) the locking unit or (b) the first pair of sidewalls; and*

*the mounting bracket includes at least one slot positioned in the other of (a) the locking unit or (b) the first pair of sidewalls, the elongated shaft engaging the at least one slot when the locking unit and the locking member are in the closed position.*

*13. The mounting bracket according to claim 11, wherein the first pair of sidewalls and the second pair of sidewalls are oriented substantially perpendicular to the longitudinal axis of the opening.*

*14. A support assembly for positioning and supporting a sprinkler head assembly in a ceiling having ceiling frame members, the support assembly comprising:*

*a latitudinal support bar having two ends and a length to extend between two of the ceiling frame members;*

*a pair of end brackets, each one of the end brackets being positioned at a respective one of the ends of the latitudinal support bar and configured to engage one of the ceiling frame members; and*

*a mounting bracket positioned on the latitudinal support bar between the end brackets and for supporting the sprinkler head assembly, the mounting bracket comprising:*

*a base configured to engage the latitudinal support bar and having an opening sized and configured to receive and engage the sprinkler head assembly;*

*a locking unit movably coupled to the base and movable between an open position permitting insertion of the sprinkler head assembly into the opening and a closed position in which the sprinkler head assembly is to be secured by the base and the locking unit; and*

*a locking member that locks the locking unit in the closed position and includes an elongated shaft that is substantially perpendicular to the latitudinal support bar when the locking member locks the locking unit in the closed position, wherein the elongated shaft engages the base and the locking unit when the locking member locks the locking unit in the closed position.*

*15. The support assembly according to claim 14, wherein:*

*the base comprises a first base wall and a first pair of sidewalls extending from the first base wall in spaced apart relation to one another, each of the first pair of sidewalls defines the opening and the opening is positioned opposite the first base wall; and*

*the locking unit is pivotally coupled to at least one of the first pair of sidewalls.*

*16. The support assembly according to claim 15, wherein the locking unit comprises:*

*a second base wall; and*

*a second pair of sidewalls extending from the second base wall in spaced apart relation from one another, wherein the second pair of sidewalls is pivotally coupled to the first pair of sidewalls.*

*17. The support assembly according to claim 16, wherein:*

*the elongated shaft is coupled to one of (a) the locking unit or (b) the first pair of sidewalls; and*

*the mounting bracket includes at least one slot positioned in the other of (a) the locking unit or (b) the first pair of sidewalls, the elongated shaft engaging the at least one slot when the locking unit is in the closed position.*

*18. The support assembly according to claim 16, wherein the first pair of sidewalls and the second pair of sidewalls are oriented substantially perpendicular to the longitudinal axis of the opening.*

*19. A mounting bracket positionable on a support assembly and for supporting a sprinkler assembly in a ceiling, the mounting bracket comprising:*

*a base having a first base wall and a first pair of sidewalls extending from the first base wall in spaced apart relation to one another, each of the first pair of sidewalls having an opening sized and configured to receive and engage the sprinkler assembly; and*

*a locking unit having a second base wall and a second pair of sidewalls extending from the second base wall in spaced apart relation from one another;*

*wherein the second pair of sidewalls is pivotally coupled to the first pair of sidewalls and the locking unit is movable between a closed position in which the base and the locking unit secure the sprinkler assembly and an open position permitting insertion and removal of the sprinkler assembly into and from the openings.*

*20. The mounting bracket according to claim 19, wherein the openings are opposite the first base wall.*

*21. The mounting bracket according to claim 19, wherein the first pair of sidewalls and the second pair of sidewalls are oriented substantially perpendicular to the longitudinal axis of the openings.*

*22. The mounting bracket according to claim 19, further comprising:*

*a locking member that locks the locking unit in the closed position and includes an elongated shaft coupled to one of (a) the locking unit or (b) the first pair of sidewalls; and*

*at least one slot positioned in the other of (a) the locking unit or (b) the first pair of sidewalls, wherein the elongated shaft engages the at least one slot when the locking unit is in the closed position.*

*23. The mounting bracket according to claim 22, wherein the elongated shaft is substantially perpendicular to the longitudinal axis of the openings when the elongated shaft engages the slot.*

*24. A support assembly for positioning and supporting a sprinkler assembly in a ceiling having ceiling frame members, the support assembly comprising:*

*a latitudinal support unit having two ends;*

*a pair of longitudinal support units, each one of the longitudinal support units being positioned at a respective one of the ends of the latitudinal support unit, each one of the longitudinal support units including a support region engageable with one of the ceiling frame members; and*

*a mounting bracket positioned on the latitudinal support unit and for supporting the sprinkler assembly, the mounting bracket comprising:*

*a base having a first base wall and a first pair of sidewalls extending from the first base wall in spaced apart relation to one another, each of the first pair of sidewalls having an opening sized and configured to receive and engage the sprinkler assembly; and*

*a locking unit having a second base wall and a second pair of sidewalls extending from the second base wall in spaced apart relation from one another;*

*wherein the second set of sidewalls is pivotally coupled to the first set of sidewalls and the locking unit is movable between a closed position in which the base and locking unit secure the sprinkler assembly and an open position permitting insertion and removal of the sprinkler assembly into and from the openings.*

*25. The support assembly according to claim 24, wherein the openings are opposite the first base wall.*

*26. The support assembly according to claim 24, wherein the first pair of sidewalls and the second pair of sidewalls are oriented substantially perpendicular to the longitudinal axis of the openings.*

*27. The support assembly according to claim 24, further comprising:*

*a locking member that locks the locking unit in the closed position and includes an elongated shaft coupled to one of (a) the locking unit or (b) the first pair of sidewalls; and*

*at least one slot positioned in the other of (a) the locking unit or (b) the first pair of sidewalls, wherein the elongated shaft engages the at least one slot when the locking unit is in the closed position.*

*28. The support assembly according to claim 27, wherein the elongated shaft is substantially perpendicular to the longitudinal axis of the openings when the elongated shaft engages the slot.*

*29. A mounting bracket for supporting a sprinkler assembly, the mounting bracket comprising:*

*a base configured to engage a latitudinal support unit, wherein the base comprises:*

*a first base wall; and*

*a first pair of sidewalls extending from the first base wall wherein each of the first pair of sidewalls includes a first opening having a shape to accommodate at least a portion of a profile defined by the sprinkler assembly; and*

*a locking unit movably coupled to the base, wherein the locking unit comprises:*

*a second base wall; and*

*a second pair of sidewalls extending from the second base wall, wherein each of the second pair of sidewalls includes a second opening having a shape to accommodate at least a portion of a profile defined by the sprinkler assembly;*

*wherein the locking unit is movable between a closed position so as to secure the sprinkler assembly in a position between the locking unit and the first base and an open position permitting insertion and removal of a sprinkler assembly into and from the first openings.*

*30. The mounting bracket according to claim 29, wherein the first openings are opposite the first base wall and the second openings are opposite the second base wall.*

*31. The mounting bracket according to claim 29, further comprising a locking member including a locking shaft for locking the locking unit in the closed position.*

*32. The mounting bracket according to claim 31, wherein the locking shaft is coupled to the base.*

*33. The mounting bracket according to claim 32, wherein the locking shaft is pivotally coupled to the base.*

*34. The mounting bracket according to claim 31, wherein the locking shaft is coupled to the first pair of sidewalls.*

*35. The mounting bracket according to claim 34, wherein the locking shaft is pivotally coupled to the first pair of sidewalls.*

*36. The mounting bracket according to claim 31, wherein the locking shaft is an elongated threaded shaft, the locking member includes a locking nut, and the locking nut is tightened on the locking shaft to lock the locking unit in the closed position.*

*37. The mounting bracket according to claim 29, wherein the locking unit is pivotally coupled to the base.*

*38. The mounting bracket according to claim 29, wherein the locking unit is coupled to the first pair of sidewalls.*

*39. The mounting bracket according to claim 38, wherein the locking unit is pivotally coupled to the first pair of sidewalls.*

*40. The mounting bracket according to claim 29, wherein the first pair of sidewalls and second pair of sidewalls are oriented substantially perpendicular to the longitudinal axis of the first and second openings.*

*41. The mounting bracket according to claim 31, wherein the locking shaft is substantially perpendicular to the latitudinal support unit when the locking shaft locks the locking unit in the closed position.*

*42. A support assembly for supporting a sprinkler assembly comprising:*

*a pair of spaced longitudinal support units;*

*a latitudinal support unit extending between and being supported by the pair of longitudinal support units; and*

*a mounting bracket supported by the latitudinal support unit and comprising a base and a locking unit;*

*wherein the base comprises:*

*a first base wall; and*

*a first pair of sidewalls extending from the first base wall, wherein each of the first pair of sidewalls includes a first opening having a shape configured to receive and engage the sprinkler assembly; and*

*the locking unit is movably coupled to the base, wherein the locking unit comprises:*

*a second base wall; and*

*a second pair of sidewalls extending from the second base wall, wherein each of the second pair of sidewalls includes a second opening having a shape configured to receive and engage the sprinkler assembly;*

*wherein the locking unit is movable between a closed position so as to secure the sprinkler assembly in a position between the locking unit and the base and an open position permitting insertion and removal of the sprinkler assembly into and from the first openings.*

*43. The support assembly according to claim 42, wherein the first openings are opposite the first base wall and the second openings are opposite the second base wall.*

*44. The support assembly according to claim 42, wherein the mounting bracket is coupled to the latitudinal support unit by positioning the latitudinal support unit between the first pair of sidewalls such that the first pair of sidewalls is substantially parallel to the longitudinal axis of the latitudinal support unit.*

*45. The support assembly according to claim 42, further comprising a locking member including a locking shaft for locking the locking unit in the closed position.*

*46. The support assembly according to claim 45, wherein the locking shaft is coupled to the base.*

*47. The support assembly according to claim 46, wherein the locking shaft is pivotally coupled to the base.*

*48. The support assembly according to claim 45, wherein the locking shaft is coupled to the first pair of sidewalls.*

*49. The support assembly according to claim 48, wherein the locking shaft is pivotally coupled to the first pair of sidewalls.*

*50. The support assembly according to claim 45, wherein the locking shaft is an elongated threaded shaft, the locking*

*member includes a locking nut, and the locking nut is tightened on the locking shaft to lock the locking unit in the closed position.*

*51. The support assembly according to claim 45, wherein the locking shaft is substantially perpendicular to the portion of the sprinkler assembly in the first and second openings when the locking shaft locks the locking unit in the closed position.*

*52. The support assembly according to claim 42, wherein the first pair of sidewalls and second pair of sidewalls are oriented substantially perpendicular to the longitudinal axis of the first and second openings.*

*53. A mounting bracket positionable on a lateral support bar of a support assembly between two end brackets and for supporting a sprinkler head assembly in a ceiling, the mounting bracket comprising:*

*a base configured to engage the lateral support bar between the two end brackets and including an opening sized and configured to receive and engage a portion of the sprinkler head assembly; and*

*a locking unit comprising a pair of connected and substantially parallel retention members that are pivotally mounted to the base;*

*wherein the locking unit is rotatable between a closed position in which the locking unit retains the sprinkler assembly in a position between the locking unit and the base and an open position permitting insertion and removal of the sprinkler assembly into and from the opening.*

*54. The mounting bracket according to claim 53, wherein the base includes a pair of connected and substantially parallel sidewalls configured to slidably receive the lateral support bar between them.*

*55. The mounting bracket according to claim 54, wherein each of the pair of sidewalls partially defines the opening sized and shaped to receive and engage the portion of the sprinkler assembly.*

*56. The mounting bracket according to claim 55, wherein each of the retention members is rotatably attached to a different one of the sidewalls.*

*57. The mounting bracket according to claim 53, wherein the retention members rotate in unison about the same axis between the closed and open positions.*

*58. The mounting bracket according to claim 56, wherein the retention members are first and second wire portions connected by a third wire portion.*

*59. The mounting bracket according to claim 56, wherein the retention members are first and second plates connected by a third plate.*

*60. A bracket for mounting a sprinkler assembly to a lateral support bar in a ceiling, the bracket comprising:*

*a base member including a first pair of spaced apart sidewalls connected by a first end wall and configured to slidably receive the lateral support bar between them, the base member also including an opening sized and configured to receive a portion of the sprinkler assembly;*

*a locking unit including a second pair of spaced apart sidewalls connected by a second end wall and rotatably coupled to the base member;*

*wherein the locking unit is rotatable between an open position in which the sprinkler assembly can be inserted into and removed from engagement with the opening and a closed position in which the base member and the locking unit retain the sprinkler assembly between the base member and the locking unit.*

*61. The bracket according to claim 60, wherein each of the second pair of sidewalls is rotatably attached to a different one of the first pair of sidewalls and the second sidewalls rotate around the same axis.*

*62. A mounting bracket for mounting a sprinkler assembly to a lateral support bar in a ceiling, the mounting bracket comprising:*

*a base configured to engage the lateral support bar and including a pair of connected, spaced apart sidewalls, each of the sidewalls having an opening sized and configured to engage a portion of the sprinkler assembly; and*

*a locking unit rotatably coupled to the base and including a pair of connected, spaced apart side members that rotate about the same axis;*

*wherein the side members are rotatably coupled to the sidewalls and the locking unit is rotatable between a closed position in which the base and locking unit secure the sprinkler assembly and an open position permitting insertion and removal of the sprinkler assembly into and from the opening.*

* * * * *